(12) United States Patent
Choi et al.

(10) Patent No.: US 12,505,555 B2
(45) Date of Patent: Dec. 23, 2025

(54) DEVICE AND METHOD FOR PROVIDING SINUS IMAGE AND LEARNING METHOD THEREOF

(71) Applicant: OSSTEM IMPLANT CO., LTD., Seoul (KR)

(72) Inventors: Kyoo Ok Choi, Seoul (KR); Jegwang Ryu, Incheon (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 175 days.

(21) Appl. No.: 18/561,137

(22) PCT Filed: Jun. 16, 2022

(86) PCT No.: PCT/KR2022/008541
§ 371 (c)(1),
(2) Date: Nov. 15, 2023

(87) PCT Pub. No.: WO2023/287041
PCT Pub. Date: Jan. 19, 2023

(65) Prior Publication Data
US 2024/0257354 A1 Aug. 1, 2024

(30) Foreign Application Priority Data
Jul. 16, 2021 (KR) .................. 10-2021-0093567

(51) Int. Cl.
*G06T 7/11* (2017.01)
*A61B 6/51* (2024.01)
(Continued)

(52) U.S. Cl.
CPC .................. *G06T 7/11* (2017.01); *A61B 6/51* (2024.01); *A61C 13/0004* (2013.01);
(Continued)

(58) Field of Classification Search
CPC ..... A61B 6/032; A61B 6/5229; A61B 6/5217; A61B 6/51; A61B 6/5223; A61B 6/501;
(Continued)

(56) References Cited

U.S. PATENT DOCUMENTS

| 8,620,091 B2 | 12/2013 | Choi | |
|---|---|---|---|
| 2011/0123076 A1* | 5/2011 | Choi | G06V 10/443 382/128 |

(Continued)

FOREIGN PATENT DOCUMENTS

| KR | 10-2011-0056952 A | 5/2011 |
|---|---|---|
| KR | 10-2019-0137388 A | 12/2019 |

(Continued)

OTHER PUBLICATIONS

Rowe SP, Fishman EK. Image processing from 2D to 3D. InMultislice CT Aug. 18, 2017 (pp. 103-120). Cham: Springer International Publishing.*

(Continued)

*Primary Examiner* — Phu K Nguyen
(74) *Attorney, Agent, or Firm* — NSIP Law

(57) ABSTRACT

An apparatus for providing a maxillary sinus image according to one embodiment includes a first artificial neural network model configured to distinguish a partial coronal plane region-of-interest from a coronal plane image of a head, a second artificial neural network model configured to, relative to an axial plane image of the head, extract a two-dimensional maxillary sinus image in an axial plane region-of-interest that corresponds to a position of the coronal plane region-of-interest, and an image processor configured to generate a three-dimensional maxillary sinus image using the two-dimensional maxillary sinus image.

9 Claims, 11 Drawing Sheets

(51) Int. Cl.
*A61C 13/00* (2006.01)
*G06T 17/00* (2006.01)

(52) U.S. Cl.
CPC .... *G06T 17/00* (2013.01); *G06T 2207/10116* (2013.01); *G06T 2207/20081* (2013.01); *G06T 2207/20084* (2013.01); *G06T 2207/30036* (2013.01); *G06T 2210/41* (2013.01)

(58) Field of Classification Search
CPC ... G06T 17/00; G06T 7/70; G06T 7/11; G06T 2207/30052; G06T 2207/30036; G06T 2207/10081; G06T 2207/20221; G06T 2207/20081; G06T 2207/10116; G06T 2207/20084; G06T 2210/41; G06T 2207/20132; G06T 2207/30008; A61C 13/0004; G16H 50/70; G16H 30/40; G16H 50/20; G16H 50/50
USPC .......................................................... 345/418
See application file for complete search history.

(56) References Cited

U.S. PATENT DOCUMENTS

| | | |
|---|---|---|
| 2018/0218503 A1 | 8/2018 | Xu et al. |
| 2019/0021677 A1* | 1/2019 | Grbic ........................ G06T 7/11 |
| 2019/0066303 A1* | 2/2019 | Neelapu .................. G06T 7/155 |
| 2021/0073987 A1 | 3/2021 | Tegzes et al. |
| 2021/0217170 A1* | 7/2021 | Ezhov .................. G06T 7/0012 |

FOREIGN PATENT DOCUMENTS

| | | |
|---|---|---|
| KR | 10-2020-0112309 A | 10/2020 |
| KR | 10-2021-0020618 A | 2/2021 |
| KR | 10-2021-0028328 A | 3/2021 |

OTHER PUBLICATIONS

Jung, Seok-Ki, et al., "Deep Active Learning for Automatic Segmentation of Maxillary Sinus Lesions Using a Convolutional Neural Network," Diagnostics, Apr. 12, 2021, (11 Pages in English).

International Search Report No. PCT/KR2022/008541 Issued on Nov. 2, 2022 (3 Pages in Korean).

Korean Office Action Issued on May 19, 2023, in Counterpart Korean Patent Application No. 10-2021-0093567 (4 Pages in Korean).

Xu, Jiangchang, et al., "Automatic CT image segmentation of maxillary sinus based on VGG network and improved V-Net", International Journal of Computer Assisted Radiology and Surgery, Jul. 16, 2020, (9 Pages in English).

Extended European Search Report Issued on Jun. 24, 2025, in Counterpart European Patent Application No. 22842304.2 (7 Pages in English).

* cited by examiner

DEVICE AND METHOD FOR PROVIDING SINUS IMAGE AND LEARNING METHOD THEREOF

CROSS REFERENCE TO RELATED APPLICATIONS

This application is a U.S. National Stage Application of International Application No. PCT/KR2022/008541, filed on Jun. 16, 2022, which claims the benefit under 35 USC 119(a) and 365(b) of Korean Patent Application No. 10-2021-0093567, filed on Jul. 16, 2021, in the Korean Intellectual Property Office, the entire disclosure of which is incorporated herein by reference for all purposes.

TECHNICAL FIELD

The present disclosure relates to an apparatus for providing a maxillary sinus image, a method for providing a maxillary sinus image that is performed by the apparatus, and a learning method of the apparatus.

BACKGROUND ART

As widely known, an implant is a dental prosthesis used by placing a fixture in a maxillary or mandibular bone and fixing an artificial tooth to the placed fixture to restore a damaged tooth. For successful implant surgery, it is important to firmly fix the fixture to the bone. Therefore, when bone tissue is weak or a bone thickness is insufficient at a position where a fixture will be placed, implant surgery is performed after augmentation of bone tissue by performing an autogenous bone graft, an artificial bone graft, an alloplastic bone graft, or the like.

However, when implant surgery is performed at a position under the maxillary sinus, in many cases, a bone thickness is insufficient relative to the length of a fixture, which causes difficulty in placing the fixture. Here, when implant surgery is performed despite the insufficient bone thickness, since a placed implant is not able to be sufficiently supported by the surrounding bone tissue, a problem such as detachment of the implant or breakage of the surrounding bone tissue during mastication may occur.

In order to prevent the above problems, when implant surgery is performed at a position under the maxillary sinus where a maxillary bone thickness is insufficient, maxillary sinus lifting is performed. Maxillary sinus lifting refers to lifting a maxillary sinus membrane formed at an inner side of the maxillary sinus and then grafting a bone onto the maxillary sinus to secure space for implant placement. Meanwhile, maxillary sinus lifting is surgery that requires a high level of skill, and in recent years, there has been great difficulty in applying image processing technology for implementation of digital dentistry to maxillary sinus lifting.

DISCLOSURE

Technical Problem

Embodiments are directed to providing an apparatus and method for providing a maxillary sinus image that can distinguish an axial plane region-of-interest from an axial plane image of a head based on a position of a coronal plane region-of-interest distinguished from a coronal plane image of the head and then determine a maxillary sinus region in the distinguished axial plane region-of-interest.

Embodiments are also directed to providing a learning method of an apparatus for providing a maxillary sinus image, the learning method allowing a first artificial neural network model and a second artificial neural network model to learn so that the first artificial neural network model distinguishes a coronal plane region-of-interest from a coronal plane image of a head, and the second artificial neural network model distinguishes an axial plane region-of-interest from an axial plane image of the head and determines a maxillary sinus region in the axial plane region-of-interest.

Objectives of the present disclosure are not limited to those mentioned above, and other unmentioned objectives should be clearly understood by those of ordinary skill in the art to which the present disclosure pertains from the description below.

Technical Solution

A first aspect provides an apparatus for providing a maxillary sinus image, the apparatus including: a first artificial neural network model configured to distinguish a partial coronal plane region-of-interest from a coronal plane image of a head; a second artificial neural network model configured to, relative to an axial plane image of the head, extract a two-dimensional maxillary sinus image in an axial plane region-of-interest that corresponds to a position of the coronal plane region-of-interest; and an image processor configured to generate a three-dimensional maxillary sinus image using the two-dimensional maxillary sinus image.

A second aspect provides a method for providing a maxillary sinus image that is performed by an apparatus for providing a maxillary sinus image, the method including: distinguishing a partial coronal plane region-of-interest from an input coronal plane image of a head; relative to an axial plane image of the head, extracting a two-dimensional maxillary sinus image in an axial plane region-of-interest that corresponds to a position of the coronal plane region-of-interest; and generating a three-dimensional maxillary sinus image using the two-dimensional maxillary sinus image.

A third aspect provides a computer-readable recording medium storing a computer program, wherein the computer program includes instructions that, upon being executed by a processor, allow the processor to perform a method for providing a maxillary sinus image, the method including: distinguishing a partial coronal plane region-of-interest from an input coronal plane image of a head; relative to an axial plane image of the head, extracting a two-dimensional maxillary sinus image in an axial plane region-of-interest that corresponds to a position of the coronal plane region-of-interest; and generating a three-dimensional maxillary sinus image using the two-dimensional maxillary sinus image.

A fourth aspect provides a learning method of an apparatus for providing a maxillary sinus image, the learning method including: to distinguish a partial coronal plane region-of-interest from an input coronal plane image of a head, causing a first artificial neural network model to learn using a learning coronal plane image of the head as first learning input data and using a masking image, in which the coronal plane region-of-interest in the learning coronal plane image of the head is masked, as first label data; and to extract a two-dimensional maxillary sinus image in a cropped image including an axial plane region-of-interest that corresponds to a position of the coronal plane region-of-interest in an axial plane image of the head, causing a second artificial neural network model to learn using a learning cropped image as second learning input data and using a masking image, in which a maxillary sinus region in the cropped image is masked, as second label data.

Advantageous Effects

According to an embodiment, an axial plane region-of-interest is distinguished from an axial plane image of a head based on a position of a coronal plane region-of-interest distinguished from a coronal plane image of the head, and then a maxillary sinus region is determined in the distinguished axial plane region-of-interest. According to such an embodiment of the present disclosure, since noise present in the axial plane image of the head, for example, cells similar to the maxillary sinus that are outside the maxillary sinus region, is accurately distinguished and excluded automatically based on the position of the coronal plane region-of-interest, it is possible to fundamentally prevent the similar cells from being included in a finally-provided maxillary sinus image.

DESCRIPTION OF DRAWINGS

FIGS. 1 and 2 show an example of a set of learning data learned by artificial neural network models in a maxillary sinus image providing apparatus to distinguish a maxillary sinus region from an axial plane image of a head, wherein FIG. 1 is a learning axial plane image of the head that is input data of the set of learning data, and FIG. 2 is a masking image in which the maxillary sinus region is masked that is label data of the set of learning data.

MODES OF THE INVENTION

Figure 1:
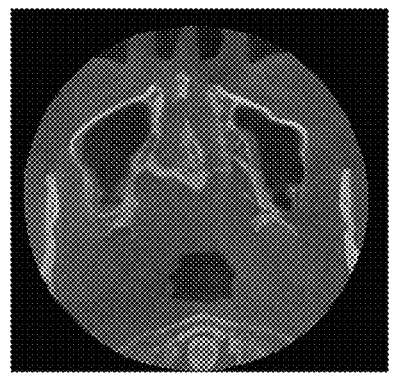

Advantages and features of the present disclosure and methods of achieving the same will become apparent from the embodiments described in detail below with reference to the accompanying drawings. However, the present disclosure is not limited to the embodiments disclosed below and may be implemented in various different forms. The embodiments herein are provided to make the disclosure complete and to completely inform those of ordinary skill in the art to which the present disclosure pertains of the scope of the disclosure. Also, the present disclosure is defined only by the scope of claims.

The present disclosure will be described in detail after briefly describing the terms used herein.

As the terms used herein, general terms that are currently widely used have been selected wherever possible in consideration of functions in the present disclosure, but the terms may vary according to an intention or customary practice of one skilled in the art, the advent of new technology, and the like. Also, a term may have been arbitrarily selected by the applicant in some cases, and in such cases, the meaning of the term will be described in detail in the corresponding part of the disclosure. Therefore, the terms used herein should be defined based on the meaning of the terms and the content throughout the disclosure, instead of being defined simply based on the name of the terms.

Throughout the specification, when a certain part is described as "including" a certain component, the certain part may further include another component instead of excluding other components unless particularly described otherwise.

Also, the term "part" used herein is software or a hardware component such as a field-programmable gate array (FPGA) or an application-specific integrated circuit (ASIC), and "part" plays certain roles. However, the meaning of "part" is not limited to software or hardware. "Part" may be configured to be present in an addressable storage medium or configured to operate one or more processors. Therefore, examples of "part" include components such as software components, object-oriented software components, class components, and task components, processes, functions, attributes, procedures, sub-routines, program code segments, drivers, firmware, micro-codes, circuits, data, databases, data structures, tables, arrays, and variables. Functions provided in components and "parts" may be combined into a smaller number of components and "parts" or may be further separated into additional components and "parts."

Hereinafter, embodiments of the present disclosure will be described in detail with reference to the accompanying drawings to allow those of ordinary skill in the art to which the present disclosure pertains to easily carry out the present disclosure. Also, in the drawings, parts unrelated to the description are omitted to clearly describe the present disclosure.

Maxillary sinus lifting refers to lifting a maxillary sinus membrane formed at an inner side of the maxillary sinus and then grafting a bone onto the maxillary sinus to secure space for implant placement and is surgery that requires a high level of skill. In order to support maxillary sinus lifting surgery, it is necessary to provide a maxillary sinus image that is obtained by distinguishing a maxillary sinus region from a medical head image.

Meanwhile, among various methods in which a maxillary sinus image providing apparatus generates and provides a maxillary sinus image from an input medical head image, a method in which the maxillary sinus image providing apparatus is configured to include an artificial neural network model, the maxillary sinus image providing apparatus learns in advance so that the artificial neural network model can accurately distinguish a maxillary sinus region from the input medical head image, and a maxillary sinus image is provided through the maxillary sinus image providing apparatus, which has performed learning, may be considered.

Figure 2:
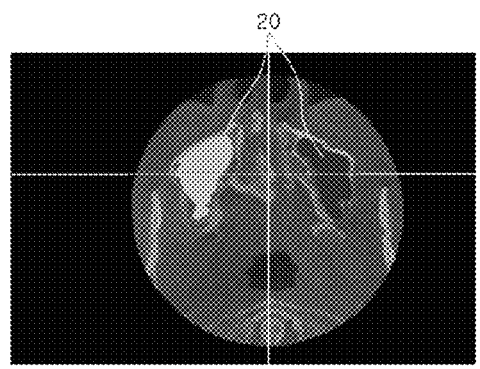

FIGS. 1 and 2 show an example of a set of learning data learned by artificial neural network models in a maxillary sinus image providing apparatus to distinguish a maxillary sinus region from an axial plane image of a head. FIG. 1 is a learning axial plane image of the head that is input data of the set of learning data, and FIG. 2 is a masking image in which a maxillary sinus region 20 is masked that is label data of the set of learning data.

Figure 3:
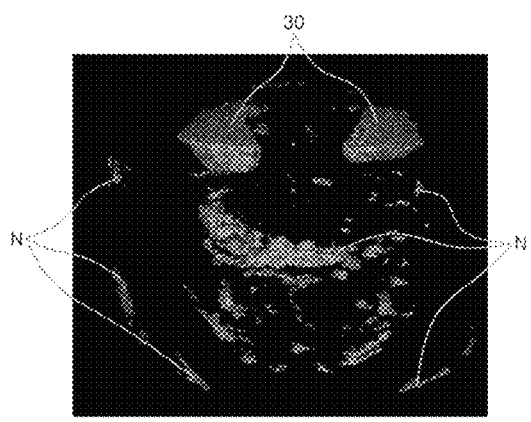
FIG. 3 is an exemplary view of a three-dimensional maxillary sinus image that the maxillary sinus image providing apparatus, including the artificial neural network models which have learned using the set of learning data of FIGS. 1 and 2, may generate from an input axial plane image of the head.

According to the maxillary sinus image providing apparatus including artificial neural network models which have learned the set of learning data of FIGS. 1 and 2 in advance, it can be inferred that the artificial neural network models may output a two-dimensional maxillary sinus image that is obtained by distinguishing a maxillary sinus region from an input axial plane image of the head, and a three-dimensional maxillary sinus image shown in FIG. 3 may be provided through image processing such as overlaying a plurality of two-dimensional maxillary sinus images.

Figure 4:
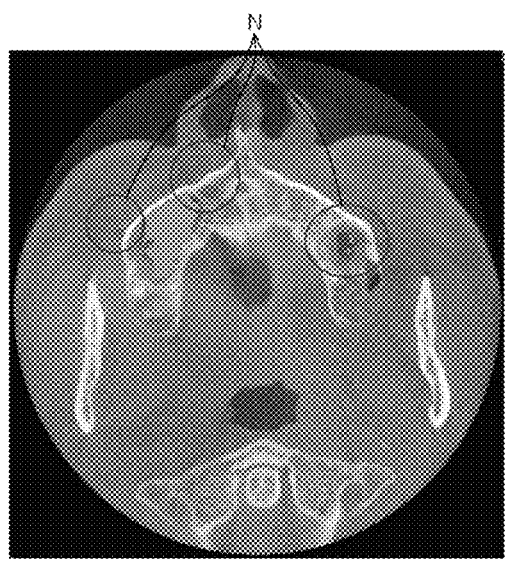
FIG. 4 is an exemplary view of a two-dimensional maxillary sinus image distinguished from the axial plane image of the head by the artificial neural network models which have learned using the set of learning data of FIGS. 1 and 2.

However, in the human head, a plurality of cells similar to the maxillary sinus are also present in regions other than the maxillary sinus region. In particular, in a case in which an axial plane image of the head is captured across the entire head, and the size of the axial plane image of the head is large while an area of the maxillary sinus region is relatively small, as illustrated in FIG. 4, noise N, other than a maxillary sinus region, may be included in multiple sites of a two-dimensional maxillary sinus image generated from the input axial plane image of the head by the artificial neural network models. In this case, as in the example of FIG. 3, various types of noise N, other than a maxillary sinus region 30, may also be included in a three-dimensional maxillary sinus image that may be finally provided by the maxillary sinus image providing apparatus.

The maxillary sinus image providing apparatus according to an embodiment of the present disclosure distinguishes an axial plane region-of-interest from an axial plane image of a head based on a position of a coronal plane region-of-interest distinguished from a coronal plane image of the head and then determines a maxillary sinus region in the distinguished axial plane region-of-interest. In this way, noise present in the axial plane image of the head, for example, cells similar to the maxillary sinus that are outside the maxillary sinus region, can be accurately distinguished and excluded automatically based on the position of the coronal plane region-of-interest.

Figure 5:
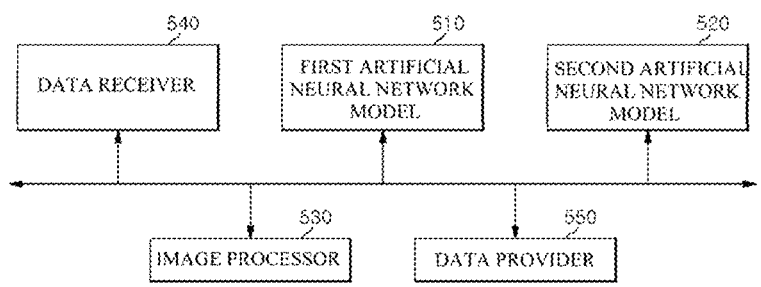
FIG. 5 is a block diagram of the maxillary sinus image providing apparatus according to one embodiment of the present disclosure.

FIG. 5 is a block diagram of a maxillary sinus image providing apparatus 500 according to one embodiment of the present disclosure.

Referring to FIG. 5, the maxillary sinus image providing apparatus 500 includes a first artificial neural network model 510, a second artificial neural network model 520, and an image processor 530. Also, the maxillary sinus image providing apparatus 500 may further include a data receiver 540 and/or a data provider 550.

The data receiver 540 is a device for receiving an image and receives a coronal plane image of the head that includes at least a portion of a maxillary sinus region or an axial plane image of the head that includes at least a portion of the maxillary sinus region. The coronal plane image of the head is a cross-sectional image in a coronal plane direction, and the axial plane image of the head is a cross-sectional image in an axial plane direction. As an example, the coronal plane image of the head and the axial plane image of the head may be images captured by a radiation imaging apparatus using the same sagittal-axial-coronal coordinate system. For example, the coronal plane image of the head and the axial plane image of the head may be dental images captured by the same cone-beam computerized tomography (CBCT) scan. The data receiver 540 may receive the coronal plane image of the head and the axial plane image of the head from another module or device, but the present disclosure is not limited thereto. As an example, the data receiver 540 may receive a CBCT image. The coronal plane image of the head and the axial plane image of the head may be generated from a CBCT image. For example, the data receiver 540 may include a communication module that can receive image data through a communication channel or a serial interface that can receive image data as an input through a communication port and may receive the coronal plane image of the head and/or the axial plane image of the head through the communication module or the serial interface.

The image processor 530 is a processor for generating a new image from an image provided from the data receiver 540. The image processor 530 according to an embodiment of the present disclosure may obtain a 3D image with minimized noise using a plurality of artificial neural network models. The plurality of artificial neural network models include the first artificial neural network model 510 and the second artificial neural network model 520. The first artificial neural network model 510 is an artificial neural network model for generating coordinate information corresponding to a region-of-interest from the coronal plane image of the head, and the second artificial neural network model 520 is an artificial neural network model for obtaining a masked axial plane image using the generated coordinate information. The first artificial neural network model 510 uses a cross-sectional image in the coronal plane direction as learning data, and the second artificial neural network model 520 uses a cross-sectional image in the axial plane direction as learning data, and pieces of data to be provided into input layers of both artificial neural network models have a difference in terms of cross-sectional direction attributes.

In more detail, the first artificial neural network model 510 may distinguish at least one coronal plane region-of-interest from the input coronal plane image of the head. The first artificial neural network model 510 learns in advance to distinguish the coronal plane region-of-interest from the coronal plane image of the head. For example, the first artificial neural network model 510 learns in advance using a first set of learning data, and the first set of learning data has the coronal plane image of the head as input data and an image in which coordinate information of the region of interest is combined (or annotated) as label data. The first artificial neural network model 510 which has performed learning may, in response to the input of the coronal plane image of the head, support generation of coordinate information of a region of interest that corresponds to the input coronal plane image of the head. For example, the first artificial neural network model 510 may extract a plurality of candidate regions that may be distinguished as the coronal plane region-of-interest from the coronal plane image of the head and may, according to a result of comparison of positions based on coronal plane coordinate values of the plurality of candidate regions or comparison of positions based on the central axis of the axial plane, determine at least one candidate region as the coronal plane region-of-interest.

The coordinate information of the region of interest generated using the first artificial neural network model 510 as described above is used to provide input data of the second artificial neural network model 520. As an example, the image processor 530 may generate a cropped image using the coordinate information of the region of interest that is generated using the first artificial neural network model 510. The cropped image is a cross-sectional image in the axial plane direction, and a normal line direction of the cropped image is not parallel to the image used as the input data of the first artificial neural network model and is orthogonal thereto in some cases. Here, coordinate information for generation of the cropped image is sagittal-axial-coronal coordinate information of the coronal plane region-of-interest.

The maxillary sinus image providing apparatus 500 may obtain coordinate information of each coronal plane image of the head from a plurality of coronal plane images of the head, and the image processor 530 may use the coordinate information to obtain a plurality of cropped images from head CT data. Each cropped image has a normal line in the axial plane direction.

More specifically, the image processor 530 uses the first artificial neural network model 510 to output sagittal-axial-coronal coordinate information of the coronal plane region-of-interest that is distinguished from the coronal plane image of the head. Also, the image processor 530 may obtain sagittal plane coordinate values and axial plane coordinate values of an axial plane region-of-interest from sagittal plane coordinate values and coronal plane coordinate values of the coronal plane region-of-interest and may distinguish the axial plane region-of-interest from the axial plane image of the head. The axial plane region-of-interest becomes a basis for generation of a cropped image.

In this way, the image processor 530 generates a cropped image, which includes the axial plane region-of-interest in the axial plane image of the head, based on the coordinate information of the coronal plane region-of-interest distinguished by the first artificial neural network model 510 and provides the generated cropped image to the second artificial neural network model 520.

The image processor 530 generates a three-dimensional maxillary sinus image using a two-dimensional maxillary sinus image provided by the second artificial neural network model 520 and provides the generated three-dimensional maxillary sinus image to the data provider 550. The image processor 530 may generate the three-dimensional maxillary sinus image by overlaying a plurality of two-dimensional maxillary sinus images output by the second artificial neural network model 520 through image processing.

Here, the second artificial neural network model 520 extracts a two-dimensional maxillary sinus image from the cropped image including the axial plane region-of-interest that is provided from the image processor 530 and provides the extracted two-dimensional maxillary sinus image to the image processor 530. The second artificial neural network model 520 may learn in advance to distinguish a maxillary sinus region from the cropped image including the axial plane region-of-interest. For example, the second artificial neural network model 520 may learn in advance using a second set of learning data, and the second set of learning data may include the cropped image including the axial plane region-of-interest as learning input data and include a masking image, in which the maxillary sinus region in the cropped image is masked, as label data.

The data provider 550 provides the three-dimensional maxillary sinus image generated by the image processor 530 to the outside. For example, the data provider 550 may include a communication module that can transmit three-dimensional maxillary sinus image data through a communication channel, include a serial interface that can output three-dimensional maxillary sinus image data through a communication port, or include a display device that can visualize a three-dimensional maxillary sinus image.

Meanwhile, the first artificial neural network model 510 and the second artificial neural network model 520 may learn using convolution neural networks. The image processor 530 may include a central processing unit (CPU), a graphics processing unit (GPU), a micro controller unit (MCU), or a dedicated processor for performing methods according to embodiments of the present disclosure.

Figure 6:
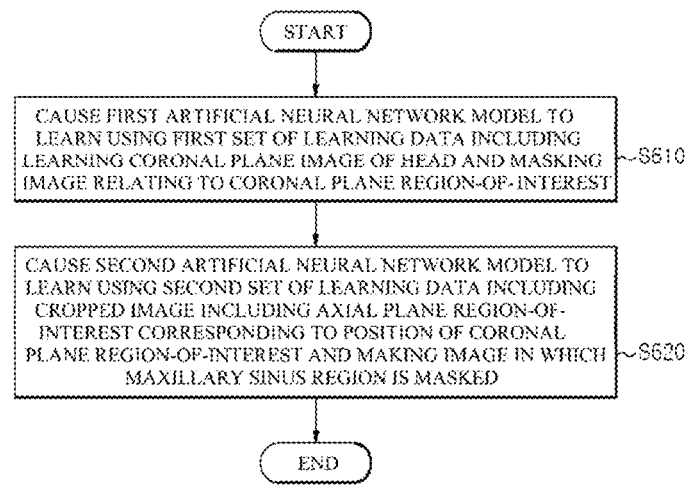
FIG. 6 is a flowchart for describing a method of learning of a first artificial neural network model and a second artificial neural network model in the maxillary sinus image providing apparatus illustrated in FIG. 5 to allow the maxillary sinus image providing apparatus to accurately distinguish the two-dimensional maxillary sinus image using a coronal plane image of the head and the axial plane image of the head.

FIG. 6 is a flowchart for describing a method of learning of the first artificial neural network model 510 and the second artificial neural network model 520 in the maxillary sinus image providing apparatus 500 illustrated in FIG. 5 to allow the maxillary sinus image providing apparatus 500 to accurately distinguish the two-dimensional maxillary sinus image using a coronal plane image of the head and the axial plane image of the head.

The first artificial neural network model 510 and/or the second artificial neural network model 520 may learn in advance by an arbitrary computing device. For the learning, a first set of learning data that is necessary for learning of the first artificial neural network model 510 and a second set of learning data that is necessary for learning of the second artificial neural network model 520 are provided.

The first set of learning data may include a learning coronal plane image of the head as learning input data and include a coronal plane image of the head, in which a coronal plane region-of-interest in the learning coronal plane image of the head is combined (or annotated), as label data. As an example, the label data for learning of the first artificial neural network model 510 may have coordinate information of the coronal plane region-of-interest, and the image processor 530 may obtain coordinate information from CT data based on the output of the first artificial neural network model 510. The image processor 530 may determine a region of interest of an axial plane image using the coordinate information obtained based on the coronal plane image.

The second set of learning data may include a cropped image including an axial plane region-of-interest, which is a portion of an axial plane image of the head, as learning input data and may include a masking image, in which a maxillary sinus region in the cropped image is masked, as label data.

By using the first artificial neural network model and the second artificial neural network model, the maxillary sinus image providing apparatus according to one embodiment of the present disclosure determines a region of interest in advance through a coronal plane image instead of immediately performing masking on an image in the axial plane direction and thus has an advantage in that it is possible to prevent noise generated due to masking performed on an unnecessary region.

Referring to FIG. 6, the maxillary sinus image providing apparatus 500 causes the first artificial neural network model 510 to learn using a prepared first set of learning data to distinguish a coronal plane region-of-interest from a coronal plane image of the head (S610). Using the first artificial neural network model 510, the maxillary sinus image providing apparatus 500 may later obtain coordinate information of the coronal plane region-of-interest. The coordinate information of the coronal plane region-of-interest may also be used as coordinate information of an axial plane region-of-interest that corresponds to the coronal plane region-of-interest.

The maxillary sinus image providing apparatus 500 causes the second artificial neural network model 520 to learn using a prepared second set of learning data to distinguish a maxillary sinus region from a cropped image of an axial plane image of the head (S620).

Figure 7:
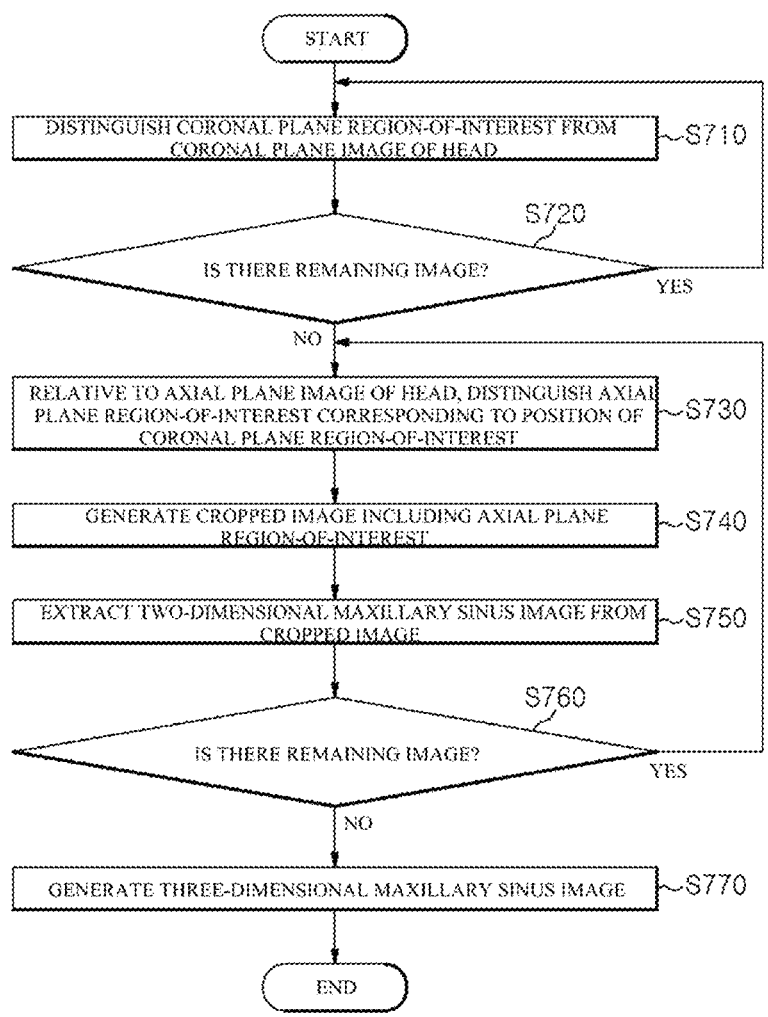
FIG. 7 is a flowchart for describing a maxillary sinus image providing method performed by the maxillary sinus image providing apparatus illustrated in FIG. 5.

FIG. 7 is a flowchart for describing a maxillary sinus image providing method performed by the maxillary sinus image providing apparatus 500 illustrated in FIG. 5, and FIGS. 8 to 11 are cross-sectional images of the head or three-dimensional images of the head that are used to describe the maxillary sinus image providing method performed by the maxillary sinus image providing apparatus 500 according to one embodiment of the present disclosure. Hereinafter, the maxillary sinus image providing method performed by the maxillary sinus image providing apparatus 500 according to the embodiment will be described in detail with reference to the accompanying drawings.

The maxillary sinus image providing apparatus 500 distinguishes a partial coronal plane region-of-interest from a coronal plane image of the head using the first artificial neural network model 510 and generates sagittal-axial-coronal coordinate information of the distinguished coronal plane region-of-interest (S710).

A maxillary sinus region is included in the coronal plane region-of-interest distinguished by the first artificial neural network model 510, and the first artificial neural network model 510 has learned in advance to distinguish the coronal plane region-of-interest including the maxillary sinus region. However, since numerous cells similar to the maxillary sinus are present in regions other than the maxillary sinus region in the human head, in order to accurately distinguish the maxillary sinus region, the maxillary sinus region and a region similar thereto may be accurately distinguished from each other.

Figure 8:
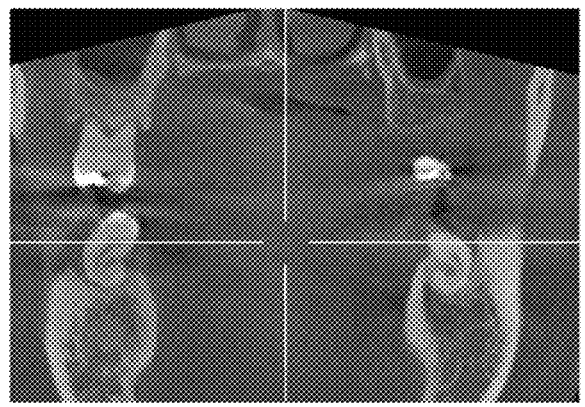
FIGS. 8 to 11 are cross-sectional images of the head or three-dimensional images of the head that are used to describe the maxillary sinus image providing method performed by the maxillary sinus image providing apparatus according to one embodiment of the present disclosure.
Figure 9:
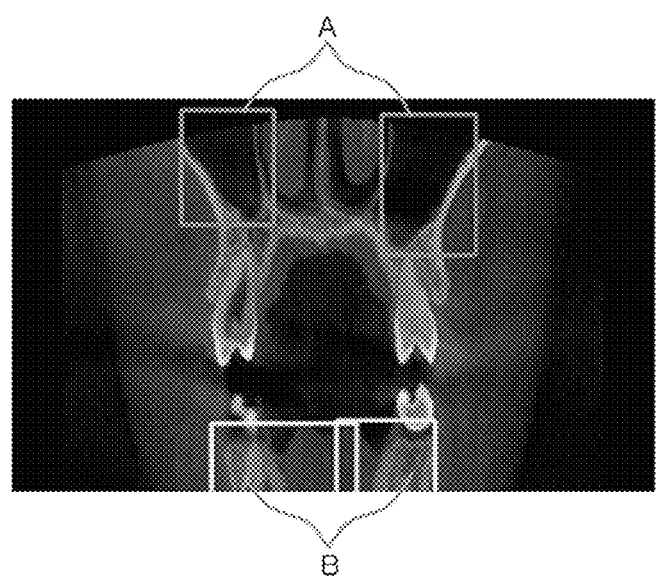

FIG. 8 is an example of a coronal plane image captured by a low-dose CBCT imaging apparatus, and FIG. 9 is an example of displaying a maxillary sinus region A present in a coronal plane image and a similar region B of a mandibular region where cells similar to the maxillary sinus are present. The first artificial neural network model 510 may extract the similar region B together with the maxillary sinus region A from the coronal plane image of the head and may select only the maxillary sinus region A while discarding the similar region B. For example, the first artificial neural network model 510 may extract a plurality of candidate regions A and B that may be distinguished as coronal plane regions-of-interest from the coronal plane image of the head and may, according to a result of comparison of positions based on coronal plane coordinate values of the plurality of candidate regions A and B or comparison of positions based on the central axis of the axial plane, determine at least one candidate region as a coronal plane region-of-interest A. For example, when comparison of positions based on the coronal plane coordinate values is performed, two candidate regions with relatively large coronal plane coordinate values may be determined as coronal plane regions-of-interest A. Alternatively, when comparison of positions based on the central axis of the axial plane is performed, a candidate region positioned lower than the central axis of the axial plane among the plurality of candidate regions A and B may be excluded, and a candidate region positioned higher than the central axis of the axial plane may be determined as the coronal plane region-of-interest A.

The above-described process in which the first artificial neural network model 510 provides sagittal-axial-coronal coordinate information showing the position of the coronal plane region-of-interest to the image processor 530 is repeatedly performed for all coronal plane images of the head that are provided for the first artificial neural network model 510 by the data receiver 540 (S720).

Figure 10:

In this way, the image processor 530 receives an axial plane image of the head and receives the sagittal-axial-coronal coordinate information showing the position of the coronal plane region-of-interest from the first artificial neural network model 510. The image processor 530 distinguishes an axial plane region-of-interest in the axial plane image of the head based on three-dimensional coordinate values of the coronal plane region-of-interest distinguished by the first artificial neural network model 510 (S730) and generates a cropped image including the distinguished axial plane region-of-interest and provides the generated cropped image to the second artificial neural network model 520 (S740). For example, the image processor 530 may provide a cropped image including an axial plane region-of-interest (ROI) that is illustrated in FIG. 10 to the second artificial neural network model 520.

Here, the image processor 530 may obtain sagittal plane coordinate values and axial plane coordinate values of the axial plane region-of-interest from sagittal plane coordinate values and coronal plane coordinate values of the coronal plane region-of-interest provided from the first artificial neural network model 510. Here, since the coronal plane image of the head and the axial plane image of the head are images captured by radiation imaging apparatuses that use the same sagittal-axial-coronal coordinate system, when a predetermined position in the head is included in both the coronal plane region-of-interest and the axial plane region-of-interest, sagittal plane coordinate values of the predetermined position in the coronal plane region-of-interest and sagittal plane coordinate values of the predetermined position in the axial plane region-of-interest are the same, and axial plane coordinate values of the predetermined position in the coronal plane region-of-interest and axial plane coordinate values of the predetermined position in the axial plane region-of-interest are the same. Therefore, the image processor 530 may distinguish an axial plane region-of-interest in the axial plane image of the head based on position information of the coronal plane region-of-interest and may generate a cropped image so that the distinguished axial plane region-of-interest is included therein.

The second artificial neural network model 520 distinguishes a maxillary sinus region from the cropped image including the axial plane region-of-interest in the axial plane image of the head that is provided from the image processor 530 and provides a two-dimensional maxillary sinus image relating to the distinguished maxillary sinus region to the image processor (S750). The above-described process in which the second artificial neural network model 520 provides the two-dimensional maxillary sinus image generated from the cropped image to the image processor 530 is repeatedly performed for all cropped images provided for the second artificial neural network model 520 by the image processor 530 (S760).

Then, the image processor 530 generates a three-dimensional maxillary sinus image using the two-dimensional maxillary sinus image provided by the second artificial neural network model 520. For example, the image processor 530 may generate the three-dimensional maxillary sinus image by overlaying a plurality of two-dimensional maxillary sinus images output by the second artificial neural network model 520 through image processing. Also, the image processor 530 provides the generated three-dimensional maxillary sinus image to the data provider 550.

The data provider 550 provides the three-dimensional maxillary sinus image generated by the image processor 530 to the outside. For example, the data provider 550 may transmit three-dimensional maxillary sinus image data through a communication channel, output three-dimensional maxillary sinus image data through a communication port, or visualize a three-dimensional maxillary sinus image on a display device. For example, the data provider 550 may visualize a three-dimensional maxillary sinus image as illustrated in FIG. 11 (S770).

Figure 11:
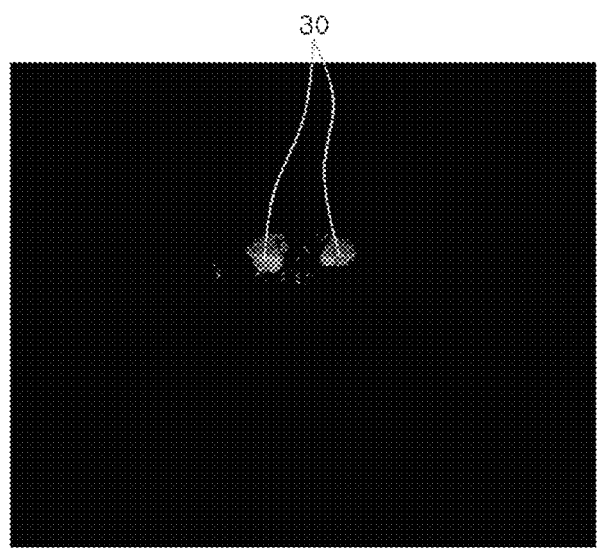

FIG. 3 is an example of a three-dimensional maxillary sinus image generated using only an axial plane image of the head, and FIG. 11 is an example of a three-dimensional maxillary sinus image generated using a coronal plane image of the head and an axial plane image of the head according to an embodiment of the present disclosure. From comparing FIGS. 3 and 11, it can be seen that noise positioned outside the maxillary sinus region 30 is significantly smaller in FIG. 11 as compared to FIG. 3.

Meanwhile, each step included in the maxillary sinus image providing method and/or the learning method of the maxillary sinus image providing apparatus according to the above-described embodiments may be implemented in a computer-readable recording medium recording a computer program that includes instructions to perform the steps.

As described above, according to an embodiment of the present disclosure, an axial plane region-of-interest is distinguished from an axial plane image of a head based on a position of a coronal plane region-of-interest distinguished from a coronal plane image of the head, and then a maxillary sinus region is determined in the distinguished axial plane region-of-interest. According to such an embodiment of the present disclosure, since noise present in the axial plane image of the head, for example, cells similar to the maxillary sinus that are outside the maxillary sinus region, is accurately distinguished and excluded automatically based on the position of the coronal plane region-of-interest, it is possible to fundamentally prevent the similar cells from being included in a finally-provided maxillary sinus image.

Combinations of the steps of each flowchart attached herein may be performed by computer program instructions. Since the computer program instructions may be embedded in a processor of a general-purpose computer, a special computer, or other programmable data processing equipment, the instructions performed through the processor of a computer or other programmable data processing equipment generate means for performing the functions described in the steps of each flowchart. Since the computer program instructions may also be stored in a computer-usable or computer-readable recording medium that may support a computer or other programmable data processing equipment in order to implement the functions in a specific way, the instructions stored in the computer-usable or computer-readable recording medium may also produce manufactured items that incorporate instruction means for performing the functions described in the steps of each flowchart. Since the computer program instructions may also be embedded in a computer or other programmable data processing equipment, the instructions that generate a process executed by the computer by a series of operation steps being performed in the computer or other programmable data processing equipment and are performed by the computer or other programmable data processing equipment may also provide steps for executing the functions described in the steps of each flowchart.

Also, each step may represent a portion of a module, a segment, or a code including one or more executable instructions for executing a specific logical function(s). Also, it should be noted that the mentioned functions may be performed in a different order in some alternative embodiments. For example, two steps illustrated as being consecutively performed may be performed substantially simultaneously in reality or may be performed in a reverse order according to corresponding functions in some cases.

The above description is only an illustrative description of the technical spirit of the present disclosure, and those of ordinary skill in the art to which the present disclosure pertains may make various modifications and changes within the scope not departing from the essential quality of the present disclosure. Therefore, the embodiments disclosed herein are for describing, instead of limiting, the technical spirit of the present disclosure, and the scope of the technical spirit of the present disclosure is not limited by the embodiments. The protection scope of the present disclosure should be interpreted by the claims below, and all technical spirits within the scope equivalent thereto should be interpreted as being included in the scope of rights of the present disclosure.

The invention claimed is:

1. An apparatus for providing a maxillary sinus image, the apparatus comprising:
a first artificial neural network model configured to distinguish a partial coronal plane region-of-interest from a coronal plane image of a head and to output coordinate information of the coronal plane region-of-interest;
an image processor configured to, based on the coordinate information of the coronal plane region-of-interest, use the coordinate information as coordinate information of an axial plane region-of-interest corresponding to the coronal plane region-of-interest, and distinguish the axial plane region-of-interest from an axial plane image of the head;
a second artificial neural network model configured to extract a two-dimensional maxillary sinus image in the axial plane region-of-interest that corresponds to a position of the coronal plane region-of-interest; and
the image processor further configured to generate a three-dimensional maxillary sinus image using the two-dimensional maxillary sinus image.

2. The apparatus of claim 1, wherein:
the image processor provides a cropped image, which includes the axial plane region-of-interest in the axial plane image of the head, to the second artificial neural network model, based on three-dimensional coordinate values of the coronal plane region-of-interest; and
the second artificial neural network model extracts the two-dimensional maxillary sinus image from the cropped image.

3. The apparatus of claim 2, wherein:
the coronal plane image of the head and the axial plane image of the head are images captured by radiation imaging apparatuses that use the same sagittal-axial-coronal coordinate system;
the first artificial neural network model outputs sagittal-axial-coronal coordinate information of the coronal plane region-of-interest distinguished from the coronal plane image of the head; and
the image processor obtains sagittal plane coordinate values and axial plane coordinate values of the axial plane region-of-interest from sagittal plane coordinate values and coronal plane coordinate values of the coronal plane region-of-interest and distinguishes the axial plane region-of-interest from the axial plane image of the head.

4. The apparatus of claim 2, wherein the second artificial neural network model learns using a cropped image including the axial plane region-of-interest as learning input data and using a masking image, in which a maxillary sinus region in the cropped image is masked, as label data.

5. The apparatus of claim 1, wherein the first artificial neural network model learns using a learning coronal plane image of the head as learning input data and using a masking image, in which the coronal plane region-of-interest in the learning coronal plane image of the head is combined, as label data.

6. The apparatus of claim 1, wherein the first artificial neural network model extracts a plurality of candidate regions that are distinguishable as the coronal plane region-of-interest from the coronal plane image of the head and, according to a result of comparison of positions based on coronal plane coordinate values of the plurality of candidate regions or comparison of positions based on a central axis of the axial plane, determines at least one candidate region as the coronal plane region-of-interest.

7. A method for providing a maxillary sinus image that is performed by an apparatus for providing a maxillary sinus image, the method comprising:
  distinguishing a partial coronal plane region-of-interest from an input coronal plane image of a head using a first artificial neural network model and outputting coordinate information of the coronal plane region-of-interest;
  based on the coordinate information of the coronal plane region-of-interest, using the coordinate information as coordinate information of an axial plane region-of-interest corresponding to the coronal plane region-of-interest, and distinguishing the axial plane region-of-interest from an axial plane image of the head;
  extracting, by a second artificial neural network model, a two-dimensional maxillary sinus image in the axial plane region-of-interest that corresponds to a position of the coronal plane region-of-interest; and
  generating a three-dimensional maxillary sinus image using the two-dimensional maxillary sinus image.

8. A non-transitory computer-readable recording medium storing a computer program, wherein the computer program includes instructions that, upon being executed by a processor, allow the processor to perform a method for providing a maxillary sinus image, the method comprising:
  distinguishing a partial coronal plane region-of-interest from an input coronal plane image of a head using a first artificial neural network model and outputting coordinate information of the coronal plane region-of-interest;
  based on the coordinate information of the coronal plane region-of-interest, using the coordinate information as coordinate information of an axial plane region-of-interest corresponding to the coronal plane region-of-interest, and distinguishing the axial plane region-of-interest from an axial plane image of the head;
  extracting, by a second artificial neural network model, a two-dimensional maxillary sinus image in the axial plane region-of-interest that corresponds to a position of the coronal plane region-of-interest; and
  generating a three-dimensional maxillary sinus image using the two-dimensional maxillary sinus image.

9. A learning method of an apparatus for providing a maxillary sinus image, the learning method comprising:
  to distinguish a partial coronal plane region-of-interest from an input coronal plane image of a head, causing a first artificial neural network model to learn using a learning coronal plane image of the head as first learning input data and using a masking image, in which the coronal plane region-of-interest in the learning coronal plane image of the head is masked, as first label data, and to output coordinate information of the coronal plane region-of-interest; and
  to, based on the coordinate information of the coronal plane region-of-interest, use the coordinate information as coordinate information of an axial plane region-of-interest corresponding to the coronal plane region-of-interest and distinguish the axial plane region-of-interest from an axial plane image of the head, and to extract a two-dimensional maxillary sinus image in a cropped image including the axial plane region-of-interest that corresponds to a position of the coronal plane region-of-interest in an axial plane image of the head, causing a second artificial neural network model to learn using a learning cropped image as second learning input data and using a masking image, in which a maxillary sinus region in the cropped image is masked, as second label data.

* * * * *